United States Patent
Abu-Hakima et al.

(10) Patent No.: US 8,051,057 B2
(45) Date of Patent: Nov. 1, 2011

(54) PROCESSING OF NETWORK CONTENT AND SERVICES FOR MOBILE OR FIXED DEVICES

(76) Inventors: Suhayya Abu-Hakima, Kanata (CA); Kenneth E. Grigg, Kanata (CA)

(*) Notice: Subject to any disclaimer, the term of this patent is extended or adjusted under 35 U.S.C. 154(b) by 689 days.

(21) Appl. No.: 11/951,572

(22) Filed: Dec. 6, 2007

(65) Prior Publication Data
US 2009/0150400 A1    Jun. 11, 2009

(51) Int. Cl.
*G06F 17/30*    (2006.01)

(52) U.S. Cl. ........ 707/705; 707/732; 707/733; 707/734; 707/769; 707/770; 707/778; 707/781; 707/784; 707/913; 709/201; 709/207; 709/225; 709/226; 455/466

(58) Field of Classification Search .................. 707/770, 707/736, 754, 999.003, 999.006, 999.007, 707/999.01, 999.107, 705, 732, 733, 734, 707/769, 778, 781, 784, 913; 709/201, 206, 709/207, 225, 226; 706/10, 11, 45; 455/466
See application file for complete search history.

(56) References Cited

U.S. PATENT DOCUMENTS

| | | | |
|---|---|---|---|
| 5,790,789 A * | 8/1998 | Suarez | 709/202 |
| 5,825,759 A * | 10/1998 | Liu | 370/331 |
| 6,108,686 A * | 8/2000 | Williams, Jr. | 709/202 |
| 6,208,986 B1 * | 3/2001 | Schneck et al. | 1/1 |
| 6,499,021 B1 | 12/2002 | Abu-Hakima | |
| 6,691,151 B1 | 2/2004 | Cheyer et al. | |
| 6,728,758 B2 * | 4/2004 | Sato | 709/206 |
| 6,820,237 B1 | 11/2004 | Abu-Hakima | |
| 6,823,331 B1 | 11/2004 | Abu-Hakima | |
| 6,832,263 B2 * | 12/2004 | Polizzi et al. | 709/246 |
| 7,010,303 B2 | 3/2006 | Lewis et al. | |
| 7,034,691 B1 | 4/2006 | Rapaport et al. | |
| 7,035,871 B2 * | 4/2006 | Hunt et al. | 707/802 |
| 7,036,128 B1 | 4/2006 | Julia et al. | |
| 7,062,723 B2 | 6/2006 | Smith et al. | |

(Continued)

FOREIGN PATENT DOCUMENTS

CA    2505223    6/2004

(Continued)

OTHER PUBLICATIONS

International Search Report from PCT application No. PCT/CA2008/002119; search completion date Feb. 13, 2009; mailing date Mar. 16, 2009.

(Continued)

*Primary Examiner* — Thanh-Ha Dang
(74) *Attorney, Agent, or Firm* — Oppedahl Patent Law Firm LLC

(57) ABSTRACT

A system for supplying network content to a device. The system includes a first interface for communicating with a network content source for retrieving the network content. The system also includes a second interface for communicating with the device for delivering processed network content to the device. The system includes an agent framework operatively connected to the first interface and the second interface and which operates a plurality of autonomous agents including a content retrieval agent, a content personalization agent, and a content delivery agent. The content retrieval agent is for retrieving the network content from the network content source via the first interface. The content personalization agent is for processing the network content thereby producing the processed network content. The content delivery agent is for delivering the processed network content to the device via the second interface.

14 Claims, 6 Drawing Sheets

U.S. PATENT DOCUMENTS

| | | | |
|---|---|---|---|
| 7,069,259 B2 | 6/2006 | Horvitz et al. | |
| 7,069,560 B1 | 6/2006 | Cheyer et al. | |
| 7,130,887 B2 | 10/2006 | Goldberg | |
| 7,133,869 B2 | 11/2006 | Bryan et al. | |
| 7,165,093 B2 | 1/2007 | Smith et al. | |
| 7,181,017 B1 | 2/2007 | Nagel et al. | |
| 7,301,450 B2* | 11/2007 | Carrino | 340/539.11 |
| 7,301,914 B2 | 11/2007 | Segal et al. | |
| 7,398,327 B2* | 7/2008 | Lee | 709/250 |
| 7,409,428 B1 | 8/2008 | Brabec et al. | |
| 7,584,244 B2* | 9/2009 | Forstadius | 709/203 |
| 7,664,233 B1 | 2/2010 | Kirchmeier et al. | |
| 7,672,991 B2* | 3/2010 | Moreau et al. | 709/203 |
| 7,685,265 B1 | 3/2010 | Nguyen et al. | |
| 2002/0169797 A1* | 11/2002 | Hegde et al. | 707/500.1 |
| 2003/0078980 A1* | 4/2003 | Carstens et al. | 709/206 |
| 2003/0193967 A1* | 10/2003 | Fenton et al. | 370/490 |
| 2004/0030741 A1* | 2/2004 | Wolton et al. | 709/202 |
| 2004/0080768 A1* | 4/2004 | Larson | 358/1.13 |
| 2004/0140989 A1 | 7/2004 | Papageorge | |
| 2004/0193617 A1 | 9/2004 | Adler | |
| 2005/0227672 A1 | 10/2005 | Lauzon et al. | |
| 2006/0010218 A1* | 1/2006 | Turcotte | 709/206 |
| 2006/0109113 A1 | 5/2006 | Reyes et al. | |
| 2006/0161635 A1 | 7/2006 | Lamkin et al. | |
| 2006/0234672 A1 | 10/2006 | Adler | |
| 2006/0271997 A1* | 11/2006 | Jacoby et al. | 725/135 |
| 2006/0273893 A1 | 12/2006 | Warner | |
| 2007/0002736 A1 | 1/2007 | Gade et al. | |
| 2007/0083561 A1 | 4/2007 | Lai et al. | |
| 2007/0156824 A1* | 7/2007 | Thompson | 709/206 |
| 2007/0209054 A1* | 9/2007 | Cassanova | 725/100 |
| 2007/0220553 A1* | 9/2007 | Branam et al. | 725/46 |
| 2007/0250591 A1* | 10/2007 | Milic-Frayling et al. | 709/217 |
| 2008/0066082 A1 | 3/2008 | Choi | |
| 2008/0162637 A1* | 7/2008 | Adamczyk et al. | 709/204 |
| 2008/0243619 A1* | 10/2008 | Sharman et al. | 705/14 |
| 2009/0055220 A1 | 2/2009 | Rapaport et al. | |
| 2009/0163183 A1* | 6/2009 | O'Donoghue et al. | 455/414.1 |
| 2009/0325538 A1 | 12/2009 | Sennett et al. | |
| 2010/0146057 A1 | 6/2010 | Abu-Hakima et al. | |
| 2010/0199188 A1 | 8/2010 | Abu-Hakima et al. | |
| 2010/0306061 A1 | 12/2010 | Wagner | |

FOREIGN PATENT DOCUMENTS

| | | |
|---|---|---|
| CA | 2460270 | 10/2004 |
| FR | 2849948 | 7/2004 |
| WO | 2009070882 | 6/2009 |

OTHER PUBLICATIONS

International Search Report and Written Opinion relating to international application No. PCT/CA2010/000510 with international filed Apr. 9, 2010.

Office Action relating to U.S. Appl. 12/329,448 dated Mar. 22, 2011.

* cited by examiner

PROCESSING OF NETWORK CONTENT AND SERVICES FOR MOBILE OR FIXED DEVICES

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

1. Field of the Invention

The invention relates generally to network communication systems and more particularly to systems for providing remote access to network resources.

2. Description of the Related Art

Electronic messaging (e.g. e-mail, chat, SMS, MMS) has become a critical tool for doing business: the ability to react rapidly to customer or colleague messages translates into a competitive advantage. Consequently, many commercial solutions have been developed to enable users to receive electronic messages while they are away from their desktop workstations. At one time, special-purpose devices filled this need, but increasingly multi-purpose devices which provide a variety of services including two-way e-mail, instant messaging, telephony, and web surfing are being used.

Many known special- and multi-purpose devices provide for remote e-mail communication. However, such solutions have critical drawbacks. Personal data assistants ("PDAs"), now commonly referred to as 'Smart Phones', and emerging "combo" devices such as the Blackberry™ Pearl™ or the Apple™ iPhone™ are expensive, and the network service charges supporting such devices are prohibitively high. Consequently, only few of the members of typical enterprises have benefited from such devices. Although ubiquitous cell phones are capable of receiving and sending e-mail, they suffer from small displays and small keyboards, and so are relatively difficult to use for electronic messaging.

Despite the fact that known devices provide for remote electronic messaging, they do not address the other part of the problem: overloading is a common complaint, with most corporate users receiving too many electronic messages daily resulting in inefficient work habits as users are continuously interrupted to check incoming messages. (This is above and beyond the spam problem, which in most enterprises is now 80% remedied by anti-spam and anti-virus filtering solutions.) Electronic message overloading is a problem on dedicated mobile messaging devices, and especially on typical cell phone devices with limited storage and display space making the solution generally unusable.

Furthermore, a growing majority of corporate electronic messaging users fall into a new category sometimes called "prosumers": corporate employees with non-corporate commitments that heavily impact their performance at work, such as child-care and personal, family or social networking messages. For these users, a single device providing access to both corporate and personal messages has not been available without forwarding personal messages to the office (or vice-versa), which for privacy and/or governance reasons has thus far not been an acceptable option.

In addition many corporate scenarios involve "communities of interest", or "closed user groups", where employees collaborate on shared research or common goals. In such scenarios, employees may share responsibilities, particularly in their need to act promptly on new information. Furthermore, when key group members are away from their offices, some communications destined for them should be shared to other delegates or to the group in general. However, known mobile solutions attempting to meet these requirements generally require significant effort to configure, and thus have not been particularly successful.

There is therefore a need for a mobile solution which provides combined access to multiple corporate and personal messaging accounts and modalities (e.g. e-mail, chat, web mail, social groups, Skype™ messages), interfacing with corporate infrastructure and Internet mail servers, intelligently supporting collaborating users, but which is agnostic to mobile device or handset type and is sensitive to electronic message overload while mobile. There is further a need for solution which miniaturizes or otherwise tailors message content for rendering on mobile devices generally.

Similarly, the World Wide Web is now widely used for all aspects of business and the ability to be made aware in a timely manner of the availability on the Web of contextually-important new content and services gives a competitive advantage. In cases where a user is away from his or her workstation a handheld device is typically used to search for new content and services. However, most handheld devices are ill-suited to display or otherwise access Web resources not specifically designed with the limitations of mobile devices in mind, and in many areas of the world mobile surfing costs are significant. Although many Web services provide notification of new content via SMS/MMS and e-mail, the more general practice is to use RSS feeds (or competing mechanisms). Such RSS feeds can be rendered in a mobile browser (subject to the same significant surfing costs), but require the user to proactively check for new content. In addition, there are no mechanisms where agents act as user proxies to broker for new services and deliver alerts based on what they find on the Internet.

There is therefore a need for a solution which provides notification of new or updated content and services automatically to handheld devices, which is agnostic to mobile device or handset type, and which miniaturizes or otherwise tailors Web content for rendering on mobile devices generally.

In addition, there are many services available through the Internet and other networks apart from electronic messaging and the Web, and while they may not presently hold as important a place as these two services in general, particular enterprises will sometimes have need of particular services not commonly utilized, including the ability to receive unsolicited content and transactions from these services remotely. Furthermore, as network computing and telecommunications evolves, new services are developed and adopted which users may wish to access remotely or receive notifications from using handheld mobile devices.

There is therefore a need for a solution which provides for automated pushing of changes to Internet or other network resources on an extensible basis, to accommodate the particular needs of a particular group of users, or to adapt to the development of new services, which is agnostic to mobile device or handset type, and which miniatures or otherwise tailors the outputs of such services for rendering on mobile or fixed devices generally.

In addition, a system as described above which is readily capable of implementation in both enterprise and web portal contexts is advantageous, as both operators of enterprise systems as well as systems to be accessed seamlessly in a broader context will be able to implement the system without customization to the context.

Furthermore, a system as described above which works with the mobile device to enable a response to the notification or alert using alternative capabilities of the mobile device, such as voice calls or TXT-ing in response to an e-mail, is advantageous.

Several solutions have been proposed which overcome some, but not all, of the above-described challenges. For example, U.S. Pat. No. 6,499,021 to Abu-Hakima describes a computer-readable system and method for interpreting and selectively forwarding an interpreted message derived from a user's received electronic message, such as an e-mail, fax, converted voice and pager messages, to a mobile communications device of the user. However, the reference does not teach a system which is adapted to be extensible to alternative and emergent content types or transactional service content, or that can forward an interpreted message as multiple smaller parts when necessary to meet changing channel capabilities. Furthermore, the reference does not teach a system which is capable of accessing multiple messages sources, and is capable of both enterprise and portal implementations. Neither does the reference teach a system which is capable of forwarding interpreted messages that incorporate 'active content' tags that enable simple initiation of voice or TXT responses to content or transactional services. Similarly, U.S. Pat. Nos. 6,820,237 and 6,823,331 to Abu-Hakima each describe some, but not all, aspects of the above-described needed solutions. U.S. Pat. No. 6,820,237 discloses a computer-readable apparatus and method for intelligently analyzing and highlighting key words/phrases, key sentences and/or key components of an electronic document by recognizing and utilizing the context of both the electronic document (which may be any type of electronic message such as e-mail, converted voice, fax or pager message or other type of electronic document) and the user. Similarly, U.S. Pat. No. 6,823, 331 discloses a concept identification system useful in reducing and/or representing text content of an electronic document and in highlighting the content of the document. However, neither reference teaches a system which is capable of accessing multiple messages sources or transactional services, of both enterprise and portal implementations, of multiple transmission modes, of finding new web content or services, and of incorporating active content added by knowledge of the user.

Thus, there remains a need for a solution which provides timely notification or alerting of new/updated electronic messages and web content or services, which is readily extensible to provide access to other content types and sources, supports closed user groups, active content for response, and supports multiple ways to reach the mobile device based on availability and cost factors. The solution must be agnostic to mobile device or handset type and be adapted to miniaturize or otherwise tailor content for rendering on mobile or fixed devices generally. In addition, the solution must be readily capable of implementation in both enterprise and web portal contexts. Finally, the solution must be dynamically extensible for handling new and unexpected content types and Internet services.

BRIEF SUMMARY OF THE INVENTION

The above-described drawbacks are overcome by the invention disclosed herein. It enables users to receive intelligently filtered notifications or alerts of messages arriving in both corporate and personal mailboxes and of designated Web RSS feeds and other Web or automated service content and transactions. The notifications can be sent to any SMS/ MMS- or e-mail-enabled device—which means essentially any mobile device presently available. The notification or alert can be in the form of a message summary, the original message or service, both the summary and the message, or simply the sender and subject: the format is tailored for the size of the device display. Intelligent context-based filters are provided to prevent overloading the subscriber with notifications of unimportant messages while they are mobile.

The invention is found in a system for supplying network content to a device. The system includes a first interface for communicating with a network content source for retrieving the network content. The system also includes a second interface for communicating with the device for delivering processed network content to the device. The system includes an agent framework operatively connected to the first interface and the second interface and which operates a plurality of autonomous agents including a content retrieval agent, a content personalization agent, and a content delivery agent. The content retrieval agent is for retrieving the network content from the network content source via the first interface. The content personalization agent is for processing the network content thereby producing the processed network content. The content delivery agent is for delivering the processed network content to the device via the second interface.

The invention is also found in a computer program product for enabling a computer to supply network content to a device. The computer program product includes software instructions and a computer-readable medium bearing the software instructions. The software instructions provide an agent framework, a content retrieval agent, a content personalization agent, and a content delivery agent, and enable the computer to perform the following predetermined operations. The network content is retrieved from the network content source by the content retrieval agent via a first interface. The network content is processed by the content personalization agent thereby producing the processed network content. The processed network content is delivered to the device by the content delivery agent via a second interface. The content retrieval agent, the content personalization agent, and the content delivery agent all operate within the agent framework and communicate via a whiteboard messaging service of the agent framework.

The invention is also found in the following system for providing network content to a plurality of devices. A first interface communicates with a plurality of sources of the network content for retrieving the network content. A second interface communicates with the devices for delivering processed network content to the devices. An agent framework is operatively connected to the first interface and the second interface, and operates a plurality of autonomous agents including the following. A plurality of content retrieval agents retrieves the network content from the network content sources via the first interface. A plurality of content personalization agents processes the network content thereby producing the processed network content. A plurality of content delivery agents delivers the processed network content to the devices via the second interface.

BRIEF DESCRIPTION OF THE DRAWINGS

An understanding of the exemplary embodiments will be obtained from the following description, with reference to the following drawings in which.

DETAILED DESCRIPTION OF EXEMPLARY EMBODIMENTS OF THE INVENTION

Figure 1:
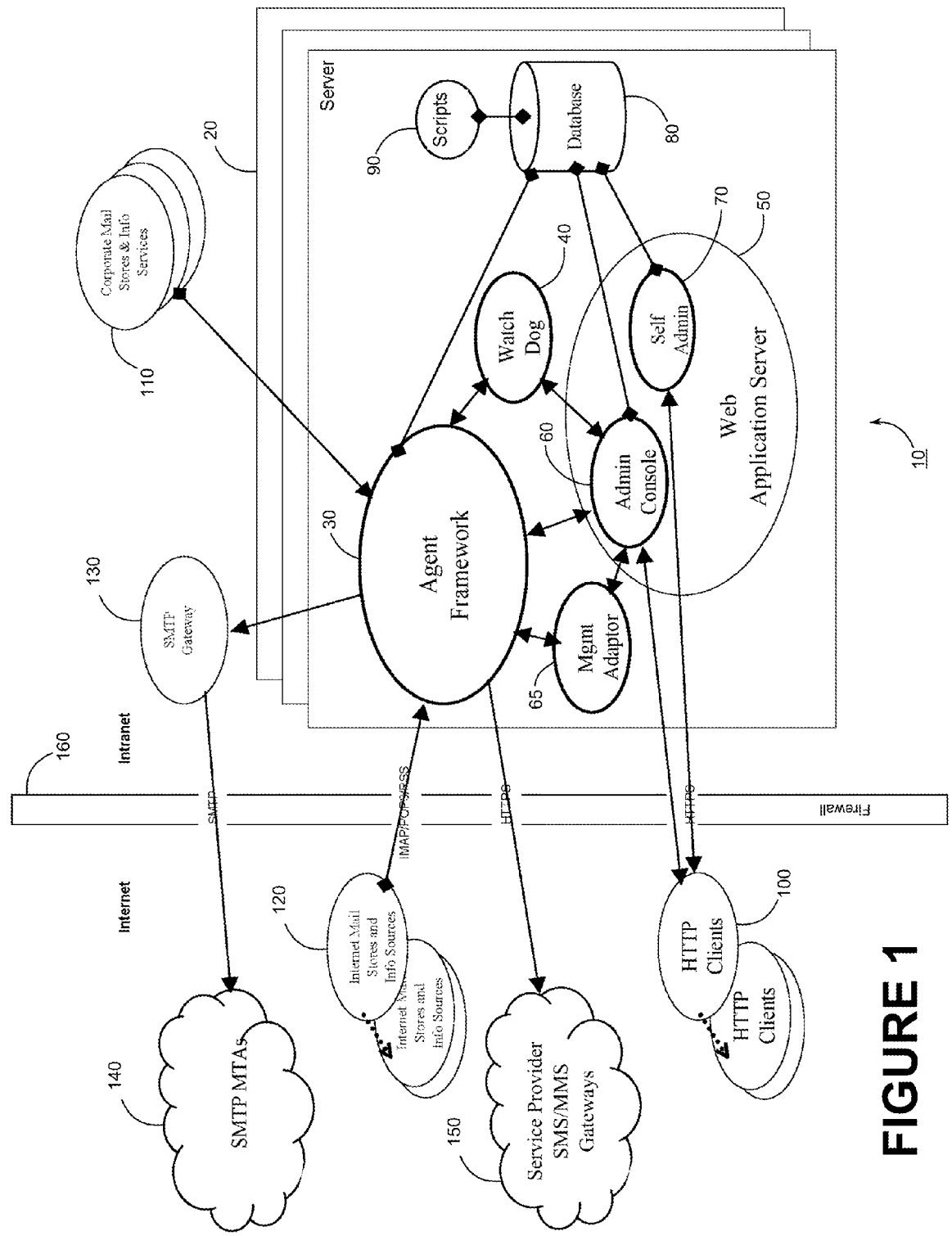
FIG. 1 shows a schematic diagram illustrating the exemplary system.

The advantages of the invention may be obtained through the exemplary system described hereinafter with reference to the drawings. Where appropriate, the same reference numerals are used in the drawings to indicate like features in all of the drawings.

System Overview

The system provides for the determination of the user's context, the retrieval of a user's messages and other selected content, the processing of such messages or other content for the intelligent miniaturization or other tailoring thereof for the user's mobile device or a set of designated delegates' mobile devices, and the forwarding of the processed content to the device(s). Such content may include: passive content—e.g., extracted from messages and informational in nature); or active content—e.g., also extracted from messages, which the user can use to trigger actions such as making a call, starting a chat, ordering payment for a service or product, etc.

The system is adaptable to retrieve messages from any source that is accessible by the system via a network including, but not limited to, the Internet. Such sources include Internet mail transfer agents ("MTAs") and SMS gateways, external and internal mail servers, including RSS feeds, native Web pages, databases, Web and Internet services.

The system provides for the maintenance of a profile for each user, wherein such profile influences the collection, processing, and forwarding of messages and other content to the user's device. The system contemplates multiple user levels wherein such parameters as message box polling frequency, message processing priority, and system resource allocation are influenced by a user's level. In at least one embodiment, the user's profile is accessible, at least in part, by the user to allow him or her to directly select preferences regarding: mailboxes or other sources for content retrieval; the manner in which such content is processed, miniaturized, or otherwise tailored for presentation on the user's device(s); and the devices to which such processed content is to be forwarded while mobile.

The system provides for the maintenance of profiles for closed user groups which influence the processing, context analysis, and forwarding of messages and other content to the devices of the users in such groups.

For accomplishing the above-described functions, the system includes a collaborative, multi-Agent Framework in which interdependent, but essentially autonomous, user-configurable agents perform many of the functions. The Framework interfaces and cooperates with components internal and external to the system, as described hereinafter. A Service providing network-accessible content or services to mobile devices is implemented as an application in the Agent Framework. This Service leverages the Framework to provide a scalable capability for registered end-users to self-manage which specific content reaches their mobile device, including the form in which it is transmitted.

The scalable multi-Agent Framework supports hundreds, thousands, or millions of users through the integration of an intelligent scheduling agent, a database connection agent, and framework support for agent pools containing variable numbers of agents to performing processing tasks. Agents are built on this framework to provide for connecting to content sources (e.g. mailboxes or servers), for applying context-based user preferences with respect to filtering and processing content, for transmitting notifications or alerts to the devices, for triggering Internet services based on active content, and for monitoring problems that may require user intervention.

The system also enables mobile users to respond to notifications through the use of messaging channels back to the Agent Framework from the mobile device. These channels include electronic messaging, SMS, instant messaging, or web browsing. In some cases, responses to notifications can be improved through the use of mobile client-based agents known by the framework. A user might, for example, want to send a "canned" response to the sender, or might want to receive the full text of a message in multiple subsequent messages if the original notification included only a small summary. The system also enables mobile users to respond to notifications through the use of active content provided within the notification. Such active content is used to enable communication methods native to the devices, such as the initiation of voice calls or chat sessions on a mobile phone. Active content may also trigger transactional services such as payment for a product or service by a user through a proxy agent with authorization from the user to perform such payment.

System Components Overview

FIG. 1 shows a schematic diagram illustrating the exemplary system 10. It includes one or more servers 20 running operating systems within which the Agent Framework 30, the Watch Dog 40, and the Web Application Servers 50 operate. An Administration Console 60 and an end-user Self Administration Portal 70 operate within one or more of the Web Application Servers 50. A Database 80 for capturing and storing all user data runs on another server or cluster of servers. Also included are scripts 90 for performing administrative tasks as described hereinafter.

The system 10 interacts with HTTP clients 100 (e.g. web browsers operated by end users) via a Self Administration Portal 70, whereby the end users can view and modify their profile and status as stored in the Database 80. It also interacts via HTTP with administrator users via an Administration Console 60, whereby administrators can monitor and configure the Service profile in the Database 80, the Agent Framework 30, and the Watch Dog 40. As described hereinafter, the Administration Console 60 also employs a Management Adapter 65 to interface the Agent Framework 30. The system 10 also interacts with sources of passive content (corporate mail stores and information services 110, and Internet mail stores and information sources 120) and active content (e.g. Internet services brokers that deliver a service or product to end users after electronic payment) via both standard and proprietary protocols to retrieve new or updated content. Finally, it also interacts with gateways via standard protocols like SMTP and SOAP to provide communication to mobile devices. Included are an SMTP Gateway 130 which is used to communicate with external SMTP mail transfer agents ("MTAs") 140 for accessing external message sources, and external Service Provider SMS/MMS Gateways 150 (which may include e-mail-to-SMS/MMS Gateways) for interfacing with mobile devices via the SMS/MMS protocol.

The Agent Framework 30 is run within a secure environment (e.g. a Java Virtual Machine) and is itself generally implemented as a closed, secure system, but the typical operating environment is in a server 20 behind a secure network firewall 160. It is not reliant upon any specific firewall functionality, but a typical installation will ensure blocking of all access ports except for those required by HTTP, SMTP, POP3 and IMAP, and their encrypted variants.

The Agent Framework 30 provides an environment for application development in the form of collaborating agents. Capabilities include: instantiation, management, and destruction of agents, support for the management of pools of cloned worker agents, inter-agent communication, timer management, and logging.

The management components external to the Agent Framework 30 include two web applications running in a Web Application Server 50. The first is an end-user accessed Self-Administration Portal 70, whereby users subscribe to the Service and manage their profile. This component interacts only with the Database 80. The second is an Administration Console 60 provided for administrators to manage the system. The Administration Console 60 leverages two additional components: a Watch Dog daemon 40, which starts, stops, and ensures robustness of the Agent Framework 30 and the Service; and a Management Adapter 65, which provides a real-time interface into the Service. The Management Adapter 65 in turn communicates with a Management Agent within the Agent Framework 30 in order to retrieve real-time status from agents that make up the Service. Additionally, external to the Agent Framework 30, periodic scripts 90 are run to maintain the Database 80 and to provide additional reporting functionality, such as providing periodic updates to users of the Service's activity regarding their own profiles.

The Service can be deployed either as an enterprise application (i.e. providing services to a group of users authenticated against local corporate domains) or as a service-provider managed application (i.e. providing services to external subscribers that are not members of a cohesive authentication domain). In the case of a corporate deployment, end-users are authenticated for self-management using domain authentication against a directory service. In a service-provider deployment, the Service provides internal authentication and password management. Other than this difference, the Service components are indifferent to the deployment scenario.

In both enterprise and service provider deployments, the system may consist of multiple Agent Frameworks 30 each controlled by a Watch Dog 40 and interfaced with a Management Adapter 65. Each such Agent Framework 30 is identified by a Service ID, and each subscriber is assigned to one Service ID, but may be moved from one Service ID to another to allow for load balancing between different instantiations. Such distributed Frameworks each operate independently, but share the User Database 80, the associated scripts 90, the Self-Administration Portal 70, and the Administration Console 60. In general, however, all of the Agent Framework 30, Watch Dog 40, Administration Console 60, Management Adapter 65, Self-Administration Portal 70, Database 80, and scripts 90 components can be combined into a single server or split into a multiple server solution. In a multiple server scenario, the Agent Framework 30 and Watch Dog 40 components are generally co-located, and may be duplicated for scalability and/or redundancy purposes. Likewise, in cases where the Database 80 is distributed across multiple servers, each such segment or portion will generally be accompanied by scripts 90 for the maintenance of that portion or segment. Multiple Web Application Servers 50 may also be provided with each operating a corresponding Administration Console 60 and/or Self-Administration Portal 70. The end-user Self-Administration Portal 70 and the Administration Console 60 are both constructed to recognize and interact with multiple Framework/Watch Dog combinations.

The management components of the system and the Agent Framework will now be described, followed by a description of components of the Service and its operation.

Service Administration Console Components

The Administration Console 60 provides an interface for administrators to monitor and manage the Service. The Console 60 is a web application that can support multiple instances of the Agent-Framework/Watch-Dog/Management-Adapter environments, which the administrators access by specifying the Service ID.

The Administration Console 60 interfaces locally or across a network with the Management Adapter 65 for access to real-time status information about the Agent Framework 30, for access to agent configuration files, for access to the Watch Dog 40 interface, and for access to utilities that provide local processing of longer commands (such as broadcasting a message to all subscribers on a specific Service ID).

The Console 60 also interfaces directly with the User Database 80 for allowing administrators to monitor and modify subscriber account data and processing results.

Service Self-Administration Portal Component

The Self-Administration Portal 70 is a web application that provides subscribers with a way to personalize the Service capabilities to match the content sources that are important to them, and to format that content for their particular devices. The portal is independent of specific Service IDs, and interacts only with the User Database 80 for reading User Data and storing back any modifications. Subscribers have no need to know the specific Service ID their account is being processed on.

Subscriber authentication to the portal leverages directory services where they exist, such as in an enterprise deployment or an LDAP-enabled Service Provider environment. In such cases, the subscriber's domain, user name, and password are used not only to authenticate to the Portal, but also to access the prime content source (usually an enterprise mailbox).

Once authenticated, subscribers are presented with a user interface that allows them to see the status of the Service's access to each of their content sources, including any persistent error state, the time of the last content forwarded, the number of content messages forwarded, and other statistics. They can also add/remove content sources, can modify their mobile devices, and can modify the forwarding and formatting personalization settings.

The Self-Administration Portal 70 also supports self-subscription, if enabled by the deployment scenario (i.e. if the Directory Retrieval Agent 570 (described hereinafter) is disabled). In this circumstance, a subscriber can access the Portal 70 anonymously and can fill out a registration form that requires identification of a prime content source (usually an enterprise mailbox) and one destination device.

Script Components

Several scripts are run periodically by the system in order to maintain the User Database 80 and to provide other administration duties. These scripts include the capabilities for:

changing the Service Level Agreement of users whose paid interval is over (e.g. change paid to free);

adding and deleting users (batch subscriptions only: single users are processed in real-time);

validating users from an external e-commerce system (in a Service Provider environment);

backing up the database;

trimming the reporting-related data (transactions) from the database; and sending unsolicited messages, for example:
- to free subscribers: e.g. advertisements for the paid service;
- to all subscribers: e.g. status messages indicating the processing and notifications performed by the Service for them over the past week or month;
- to targeted subscribers: advertisements for 3rd parties;
- to expiring subscribers: warning that their paid service is about to expire and that user will be downgraded to the free service; and
- to welcome new users.

Collaborative Agent Framework

Figure 2:
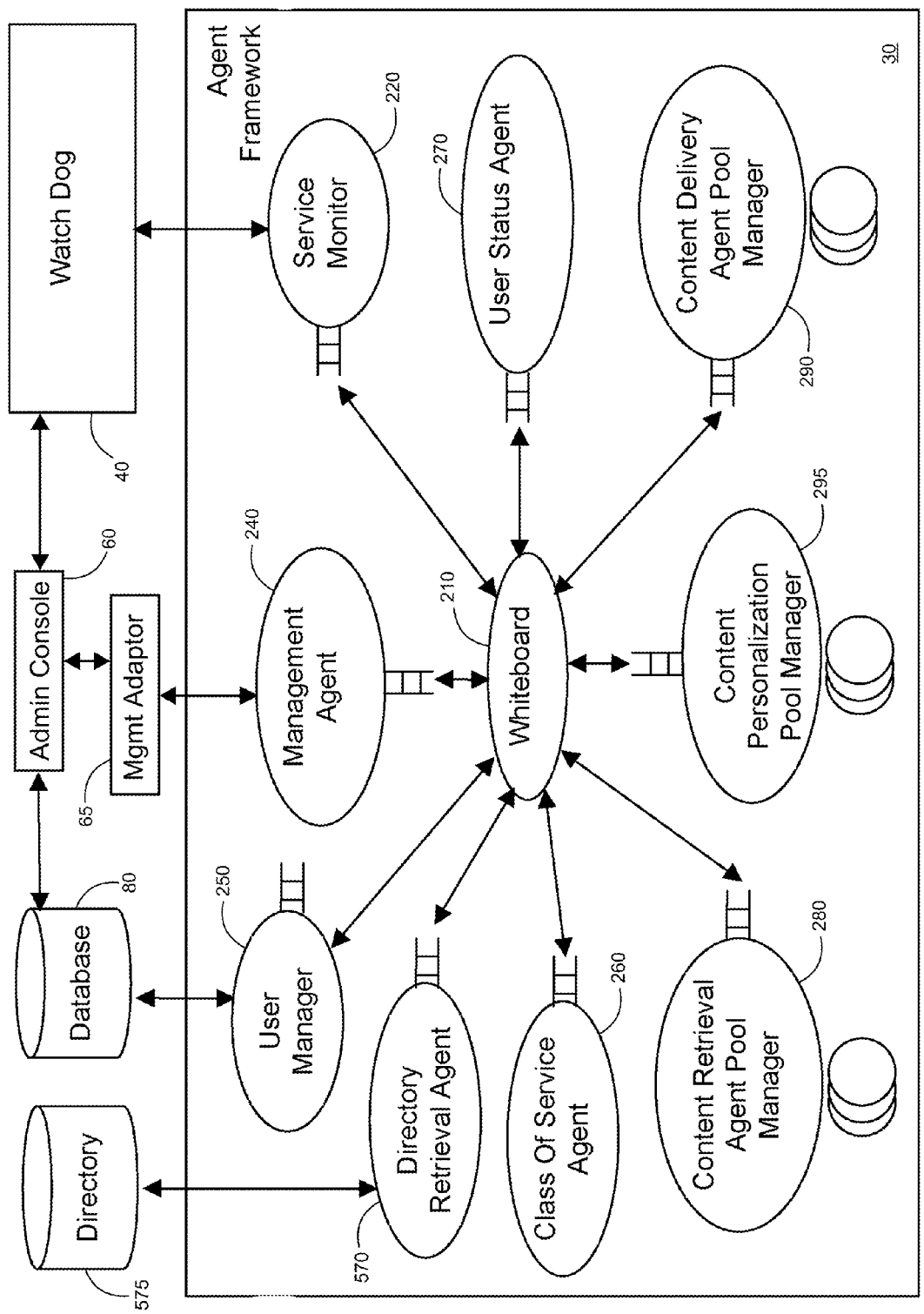
FIG. 2 shows a schematic diagram illustrating components of the Agent Framework of the exemplary system illustrated in FIG. 1.

FIG. 2 shows a schematic diagram illustrating components of the Agent Framework 30, agents of the Service operating in the Framework 30, and several of the system components external to the Framework which have already been introduced. The Framework 30 supports two forms of agents: singleton agents and pooled agents. Any function requiring an agent may be performed by a singleton agent; however, in the exemplary system, pooled agents (described further hereinafter) are ordinarily used for performing Service functions that can be scaled through multiple concurrent activities, and singleton agents typically provide application control or access to and management of constrained resources (such as the pooled agents).

Figure 3:
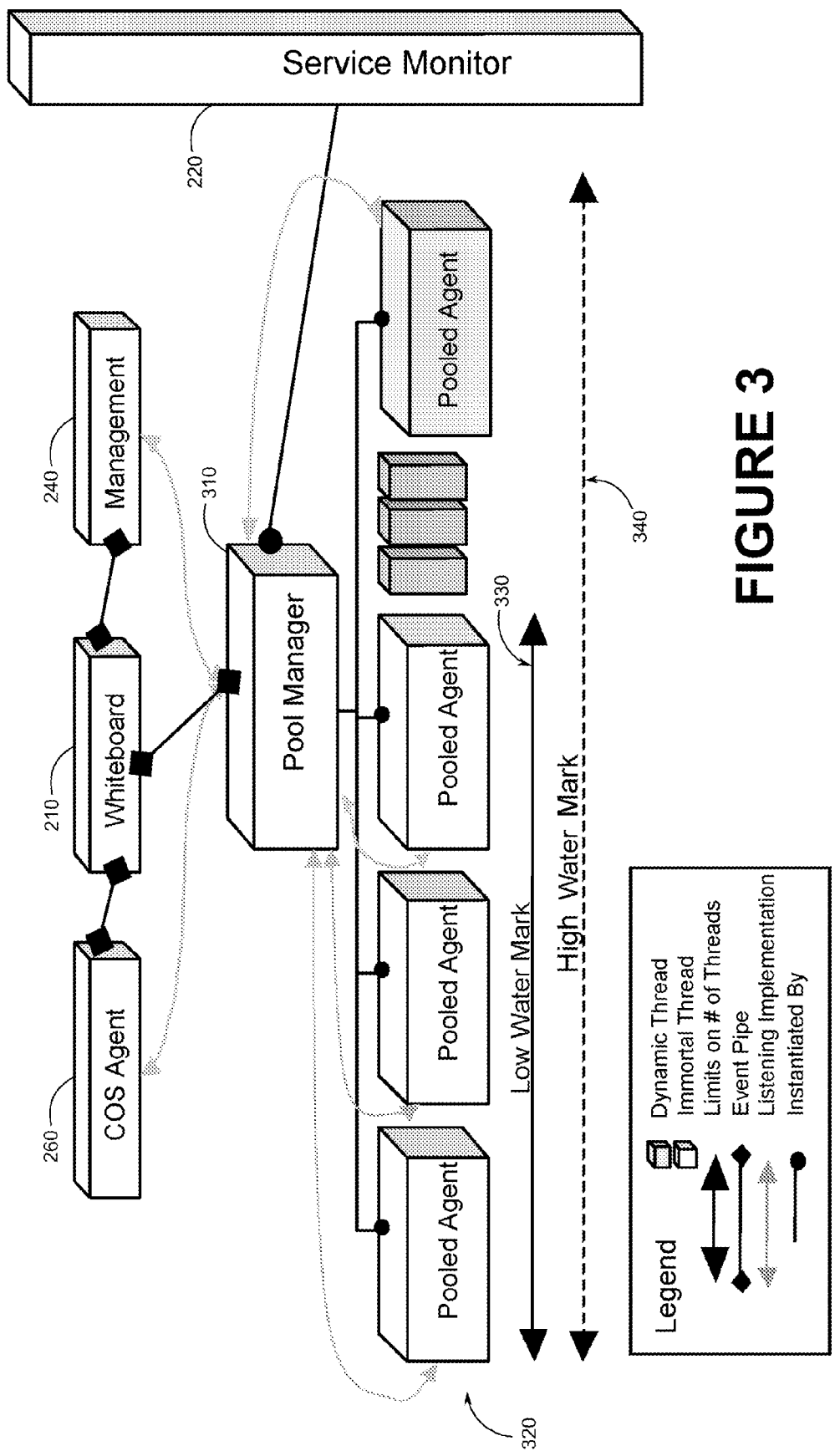
FIG. 3 shows a schematic diagram illustrating an agent pool management framework employed by the Agent Framework illustrated in FIG. 2.

Singleton agents providing control over pooled agents make use of the pool management facilities of the Framework which support creation, distribution of work, sanity checking, destruction, and reincarnation (i.e. reactivation when excessively delayed in delivering a result) of the pooled agents. The Framework 30 provides the ability to manage performance and scalability by means of agent pool management. With reference to FIG. 3, the Pool Manager 310 manipulates the number of threads provided by an agent for doing work. The role of the Pool Manager 310 is to act like a bridge by allowing a pool of agents 320 to take the place of a single agent, while maintaining the same interface as the single agent. It manages the delegation of received events to the pooled agents 320, and responds to the replaced agent's events normally. Such events are processed in parallel through the pool of agents.

The Pool Manager 310 has operating parameters that place limits on the number of agents within a pool. The minimum number of agents (i.e. the 'low water mark' 330) are automatically instantiated upon pool initialization. The Pool Manager 310 can then create more agents as needed to manage incoming requests, subject to the limitation of the maximum number of agents (i.e. the 'high water mark' 340). In the description and Figures, reference may be made alternatively to a 'poolable agent' or to a pool manager of such agents, but it will be appreciated that either reference includes either alternative.

With reference again to FIG. 2, the Agent Framework 30 provides a Whiteboard 210 messaging system for agent interaction. The Agent Framework 30 also provides timer management facilities supporting the creation and destruction of timers, as well as the handling of timeouts. It also provides logging facilities for hooking the Service into the logging mechanism of the host operating system. Finally, the Framework 30 provides a mechanism for receiving startup, graceful shutdown, immediate shutdown, and sanity check commands from an external entity (e.g. the Watch Dog 40).

Applications running within the Agent Framework 30 are developed using the defined interfaces of the Framework, which require the applications to implement known interfaces for initialization, destruction, and sanity checks. The Service agents integrate into the Framework through either pre-configuration of the Service Monitor Agent 220 or via external injection from the Watch Dog 40. The Service Monitor Agent 220 handles the starting, stopping, and sanity-checking of the Service agents at the request of the Watch Dog 40. The Service agents leverage the Whiteboard 210 interfaces for communications, timers, pool management, and logging.

Agents implemented using the Agent Framework 30 are architected to be event-driven, waiting to receive events (messages and timer events), processing each one to completion, then waiting for the next event. Agents typically keep any persistent configuration data in property files (flat files). When the agent is launched it initialises all of its configuration values from its persistent storage, and then reports that it is ready to start processing events. When it receives a shutdown event it will write any new configuration data to the persistent storage before shutting down.

The Framework components will now be discussed in greater detail.

Framework Whiteboard

The Whiteboard 210 is the messaging service for providing messaging between the agents. Events are sent to the Whiteboard 210 from any agent and forwarded to the queues of any agents that have registered to receive such events. Receiving agents process the notifications in order, to completion, as part of their event loop. This mechanism allows agents to post specific rich content message events and to request notification of the posting of specific events. For example, a worker agent that has completed work could post a Content-Retrieval Complete message, and any waiting application agents would receive the message.

Multiple queues are provided for each agent to support messages of differing priorities, with the number defined by the application's requirements. The agent is given only a single interface to the queues: the Whiteboard 210 ensures that higher-priority events are handled before lower-priority messages.

The Whiteboard 210 is also capable of moving message queues between agent instances. This is done automatically when the Service Monitor Agent (SMA) 220 deems an agent "insane", as described below. After a new clone of the agent is created, the Whiteboard is directed to give the original's incoming message queue to the new agent.

Framework Management

The Agent Framework 30 provides a Service Monitor Agent (SMA) 220 for application management. It provides the start-up, status, and shutdown access point for the agents within the Agent Framework 30. Agents are created variously through SMA 220 configuration properties, through Watch Dog 40 injection to the SMA 220 (where the path to the agent software is identified), or by hard-coding into the SMA 220 start-up list. At Framework start-up, the SMA 220 listens for a connection from the Watch Dog 40 for controlling the service, and, once connected, responds to Watch Dog 40 commands to start, stop, and poll the agents.

Figure 4:
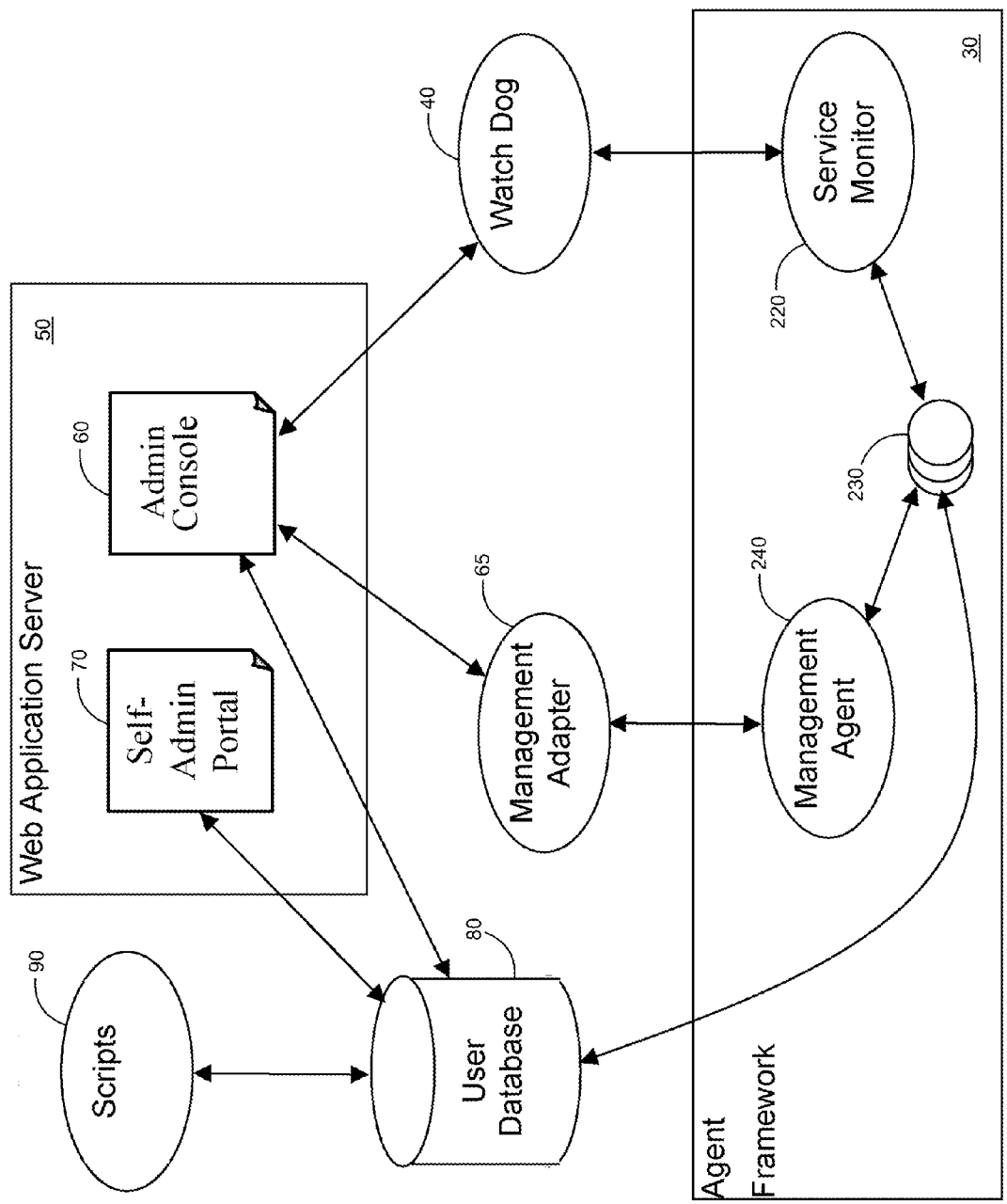
FIG. 4 shows a schematic diagram illustrating a subset of the agents and system components involved in management of the Agent Framework illustrated in FIG. 2.

With reference to FIG. 3 and FIG. 4, the latter showing a subset of the agents and system components involved in Framework management, the SMA 220 polls the manageable agents 230 (representing any of the Service agents shown in FIG. 2) at the request of the Watch Dog 40 to determine if they are all still alive and able to process events. If a persistent unrecoverable agent failure is detected, the SMA 220 will initiate a service shutdown and report this event back to the Watch Dog 40. When commanded, the SMA 220 initiates a shutdown by asking each agent 230 to shut down (on its high priority message queue), and awaits their responses. Any agents 230 not responding within a configured time are killed. Data may be lost if shutdown is not controlled and the agent 230 has to be terminated.

If a single agent is deemed insane, the Whiteboard 210 will hold messages for such agent until the new instance is up and running. A new instance of the agent will be created and initialized. The new agent's queue will be populated with the messages retrieved from the dying agent via the Whiteboard 210.

Framework Timer Management

The Framework 30 provides agents with the capability to start, stop, and handle interrupts from timers, generally used to provide periodic services and to recover from networking problems. A timer management facility of the Framework allows a client agent to create any number of timers, which can be single shot (one timeout), or repetitive (start again after the first timeout). When a timer expires, it calls back to an interface that the agent provides to the timer management facility. To improve CPU use efficiency, the agent specifies the lowest resolution of timer that is desired (the "tick length"). The timer management facility can thereby minimize processing at each of the system-level timer interrupts, allowing for efficient high and low resolution timers.

Framework Logging

The Framework provides agents with a logging facility for logging activity to mechanisms on the local operating system, or to a central server if multiple Service IDs are in use. It supports run-time determination of the logging method, and offers a factory-based instantiation model, where agents can create their own log headers in order to clearly identify the originator of each log. Additionally, logs from several Agent Frameworks can be combined and centrally located if necessary.

Watch Dog Component

Operating as a persistent "daemon" within each collaborating server, the Watch Dog 40 is started and stopped under administrator control and automatically restarted in the occurrence of a server reboot. The Watch Dog 40 ensures robustness of the Service by maintaining a connection to a corresponding Service Monitor Agent 220 operating within the Agent Framework 30, offering recovery from problems with the Agent Framework 30 that were unforeseen, such as unexpected message formats and/or networking problems that could cause the system to slow down or run out of memory.

At a tunable frequency, the Watch Dog 40 requests a sanity check from the Framework, which returns a status of e.g. red/yellow/green. Agent Framework 30 applications determine what constitutes a yellow or red condition themselves, responding to the Service Monitor Agent 220 which in turn responds to the Watch Dog 40 with a rollup of the individual application states. The Watch Dog 40 responds to the rollup states by restarting the Agent Framework 30 if a red status is returned, or in the case of a configurable number of repeated yellow states. It also treats non-response as a red status, forcing a restart of the Agent Framework 30.

In addition, the Watch Dog 40 produces alerts to inform administrators of automated problem recovery and when administrator assistance is necessary. The Watch Dog 40 further provides a console interface for manually starting/stopping/restarting the service and checking its status, although typically administrators interact with the Watch Dog 40 via an application-specific administration console.

Service Management Agent

The Management Agent (MA) 240 is responsible for managing all real-time management queries from the Management Adapter 65 component (i.e. from the Administration Console 60). It can request that all manageable agents report their status, and can push information to a specific agent for tweaking settings while the system is live. It also listens for critical system errors such as SMTP connection failure, and informs the Management Adapter 65 for administrator notification when such a failure occurs.

Service Application Overview

With reference again to FIG. 2, the Service Application includes a Mobile Network Content Service application operating in the Agent Framework 30 consisting of a set of collaborating agent types: Management Agents (MAs) 240, User Management Agents (UMAs) 250, Class of Service Agents (CSAs) 260, User Status Agents (USAs) 270, Content Retrieval Agents (CRAs) 280, Content Delivery Agents (CDAs) 290, and Content Personalization Agents (CPAs) 295. (The latter three are shown as corresponding pool managers; as discussed above, these agents are preferably poolable agents for managing performance and scalability.) As described hereinafter, these agents collaborate to provide subscribed users with network-accessible content of interest on their mobile devices in device-appropriate format in near-real-time.

The Service may be used to forward to a mobile device any content accessible by the server on which the Service agents reside. Examples are: e-mail from mail store mailboxes; blog content from RSS feeds (or other methods); web content from WAP or HTTP access (or other methods); active Internet content requiring user response or authorization, e.g. for payment for a service or product; textual data from database queries or Service-Oriented Architecture (SOA) queries (or other methods); and documents, document text and images from file servers and document repositories. Content is deemed 'of interest' if it meets any of the subscriber's configured preferences, which involves filtering against metadata from the content. Examples are the content originator or a phrase included in an 'allow list' and not in a 'block list', or if the content appears within a specific timeframe, or the content is of a specific format (e.g. a voice message).

In rendering content for forwarding to a mobile device, the Service may employ any device-appropriate format including anything from the subject of an e-mail or the title of a blog post to a full word-processing document to a voice or video message, depending upon the capabilities of the mobile device (e.g. screen size, on-board applications, communication channels) and the preferences of the subscriber. Since mobile devices generally provide a subset of desktop capabilities, a summary, snapshot, or lower-resolution rendering of the content is usually the preferred format.

The Service preferably forwards content in 'near-real-time', meaning that the Service is polling the content sources configured by the subscriber at the rate given in a Service Level Agreement (SLA, described hereinafter), normally on the scale of minutes. When new content is detected on any of the configured content sources, it is processed according to the subscriber's preferences and, if warranted, it is forwarded in the appropriate form to the subscriber's mobile device.

In addition to polling, the Service supports subscriber forwarding of content, for example to process e-mail arriving in a mailbox that is not accessible by POP3 or IMAP protocols, or to process alerts from a solution that does not provide programmatic access. All such content arrives in a 'forwarding mailbox', one for each Service Level Agreement level, which is then polled regularly for new content. There is also a Service-wide 'error mailbox' provided to catch messaging bounces and other problems from devices that are reached via SMTP. This mailbox is also regularly polled, and any parseable errors are automatically processed and added to the affected subscribers' Database records for later problem notification treatment.

The Service components will now be described in greater detail.

Service Class-Of-Service Agent

Figure 5:
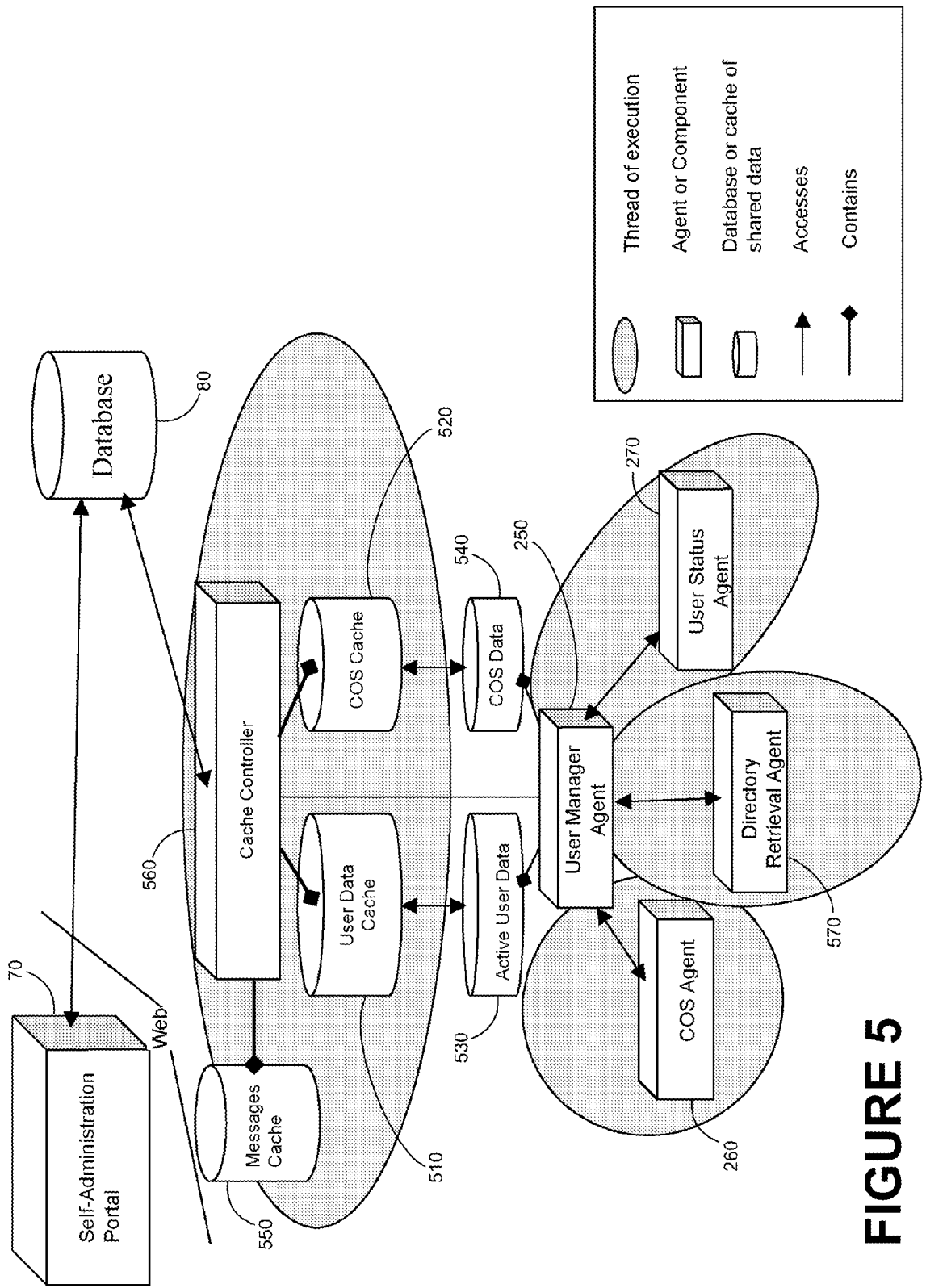
FIG. 5 shows a schematic diagram illustrating the components of the system illustrated in FIG. 1 involved in the management of subscriber accounts of the system.

With reference again to FIG. 2, and to FIG. 5 showing the components of the system involved in the management of subscriber accounts, the Class-Of-Service Agent (COSA) 260 controls the inflow of work to the Service, and acts as a coordinating point for account management as each subscriber account is processed. The system contemplates that users are classified according to a Service Level Agreement (SLA); for example, some users may receive the service without charge, while other users pay a fee. The COSA schedules work equally for all subscribers at a specific class-of-service according to the SLA, but generally gives temporal and processing priority to, e.g. paying subscribers over non-paying subscribers.

Each subscriber of the Service will have identified one or more content sources that he/she wants to have delivered to their mobile device. The COSA schedules work (a 'transaction') for each content source separately. It co-ordinates with the User Manager Agent 250 to check-out (i.e. reserve) a list of content sources which it processes (i.e. retrieves contents) simultaneously. The algorithm for checking out a content source may or may not depend on the subscriber: generally a single subscriber's content sources are scheduled for retrieval before another subscriber's sources are considered, but the COSA has information on how many transactions of each media type are active, and can leverage this to improve overall processing efficiency by scheduling different media types across different subscribers as it attempts to maintain each subscriber's SLA.

The COSA's decision to process a certain account at a certain time takes into consideration the following factors:
1. the class of service of the subscriber (i.e. premium, free, etc.) and therefore the priority of the subscriber;
2. fairness, such that all users in a specific SLA are given the same polling frequency, with the exception of when a poll takes longer than the polling frequency (in which case the account poll starts as soon as possible after the previous poll times out);
3. the type of account being processed: polling-subscriber's account, shared-forwarding account, or error account (described hereinafter); and
4. the volume of messages currently in the system.

If the system becomes too busy, due to factors such as the detection of low memory, too much subscriber content received (a good indicator of impending low memory), all pooled agents in use, an operator-imposed stand-by condition, etc., then the COSA ceases to schedule new transactions until the condition clears.

There are four 'special' subscriber content sources that the COSA must process in particular ways: a 'forwarded' account, an 'error' account, zero or more 'SMS/MMS reply' accounts, and a 'remote control' account. These may reside on any message server accessible by the system. The 'forwarded' account identifies a named Service mailbox that subscribers identify as one of their content sources. In this case, when the new e-mail is retrieved for this account, the COSA separates the e-mail into individual 'sub-transactions' for each originating subscriber found, checking out each subscriber for each sub-transaction. (Messages from unknown forwarders is discarded.) The transactions, which include the set of messages and the actual subscriber's User Data, are then forwarded to the Content Personalization Agent (CPA) 295 (and thereafter to the Content Delivery Agent (CDA) 290 for personalization and delivery as appropriate. When all individual transactions are completed the main 'forwarded' account transaction is closed.

Similarly, the 'error' account identifies another named Service mailbox that receives message bounce errors for SMTP-transmitted notifications sent by the Service. When the COSA 260 receives the new message from this mailbox from the Content Retrieval Agent (CRA) 280, it identifies the affected subscribers through matching the device e-mail address in the error e-mail. The COSA 260 then sends 'lost transaction' events to the User Status Agent (USA) 270 for each failed transmission, and the USA in turn then updates each subscriber's error status.

Similarly the 'SMS/MMS reply' account identifies one or more named Service mailboxes that receive replies to messages from SMS/MMS-enabled subscriber devices. Replies from these devices are sent from an SMS/MMS Gateway Handler (e.g. a small web application operating in the Web Application Server 50 that receives posts from the Service Provider SMS/MMS Gateway 150 and translates them to e-mail) to the named mailbox. When the COSA receives new messages from this mailbox from the CRA, it extracts the SMS message index from the message that was replied to from the mail, and the subscriber's response subject and text from each mail. The SMS indexes are matched against the transaction records stored in the User Database, and the content originator is retrieved from the matching record. The COSA then creates a transaction for the subscriber and forwards it to the CDA for delivery by electronic messaging to the original sender of the message.

Similarly, the 'remote control' account identifies a named Service mailbox that provides a subscriber-to-Service response channel for remote control of the Service while mobile. This can be supported for e-mail enabled devices directly, and for SMS/MMS-enabled devices via the same mechanism used by the 'SMS/MMS reply' method. When the COSA retrieves new e-mail from this mailbox from the CRA, it extracts the originating device address, a command, and optionally an identifier (e.g. SMS ID or e-mail subject). The originating address is matched to a subscriber account, and if present, the identifier is matched to one of the subscriber's transactions. This capability supports commands such as:
  deleting e-mail that has been forwarded to the device from a mailbox;
  asking for full text of summarized content to be forwarded;
  selection of an alternate device (when multiple have been pre-configured);
  turning the Service notification on or off.

For commands that require access to a mailbox, the COSA originates a transaction for the subscriber, overriding the normal user preferences held in the User Data. Otherwise the COSA simply updates the cached User Data.

The COSA's standard responsibilities are therefore:
  to determine at what frequency the forwarding and error mailboxes are polled in relationship to the polling frequency of the subscriber accounts;
  to ensure that the each subscriber account is opened, processed and closed successfully in accordance with the SLA;
  to recognize the changing load and adapt the scheduling rate as subscribers turn off or on notification, and as new subscribers are added;

optionally, to limit the maximum number of messages forwarded and maximum number of bytes processed per user per day;

optionally, to limit the total number of bytes processed;

if a subscriber is in 'notification off' mode, to not send a request through the system, whether it originates from normal subscriber processing or from the forwarded mailbox; and to handle errors encountered during the processing of each subscriber account, allowing the system to recover appropriately.

When subscribers configure their mailboxes to auto-forward messages to one of several communal mailboxes (one per SLA) (instead of having the Service poll the subscribers mailbox), the responsibilities of the COSA are:

to sort the messages by username and time received;

to validate the user identities, filtering out any spam and other non-subscriber messages; and to group messages by user and send each set of mail to the appropriate Content Personalization Agent Pool Manager for parsing and processing.

Service User Management Agent

The User Manager Agent (UMA) 250, shown in FIGS. 2 and 5, coordinates all access by the Service agents to subscriber accounts within the User Database 80. It provides an API supporting the various query types required by the other agents, such as adding or removing subscribers, checking for the existence of a particular subscriber, matching a subscriber name with their password, and the retrieval and storage of User Data objects that each contain all information required to processor a subscriber (account details, content sources, mobile devices, and personalization preferences).

As illustrated in FIG. 5, the UMA maintains cached copies 510, 520 of the User Data 530 and Class of Service (COS, i.e. SLA) Data 540, as well as a Messages Cache 550 of end-user messages, in the User Database 80 via a Cache Controller 560. The Cache Controller 560 independently maintains the caches 510, 520, 530 by periodically synchronizing them with the User Database 80. For efficiency, the UMA 250 also keeps read-only copies of the User Data 530 for subscriber accounts that are in a 'forward' state (i.e. not those that have temporarily turned off the Service). As the User Data 530 is changed from transaction processing, it is written back into the User Data Cache 510, which is then synchronized with the Database 80 sometime later. Similarly, if the User Data Cache 510 is updated from the User Database 80, the changes are propagated into the read-only copies for the next subscriber transaction.

The UMA 250 optionally collaborates with an optional Directory Retrieval Agent (DRA) 570 (discussed further hereinafter) for the purpose of managing subscriber population in the User Database 80. If the DRA 570 is not used, the subscriber population in the User Database 80 is managed via the Self-Administration Portal 70.

The UMA 250 collaborates with the COSA 260 for the purpose of scheduling of subscriber processing by being ready to service a request for the next user to process from the User Data Cache 510. The request for the next user could be specified as the next user of a specified SLA, as the forwarding account for a specific SLA, or as the error account for the system.

The UMA 250 further collaborates with the COSA 260 for maintaining consistent representations of subscribers' content sources, and updating dynamic information about the processing of subscriber accounts such as counts of messages processed, the number and type of errors encountered, and the success/failure of each process cycle (transaction), used for reporting purposes. The representations of subscribers' content sources generally involve taking a snapshot of the current state. For example, a mailbox state representation would include the arrival date of the last mail received at polling time, and a blog state representation would include the posting date of the last message at polling time, and a document repository representation would include the date of the last document updated at polling time.

The UMA implements the above-described database cache for efficiency reasons. The cache is updated on a periodic cycle, and holds the sets of User Data for each SLA level, the per-subscriber errors encountered, the transactions records, the parameters for each SLA level, and the list of notification messages provided to subscribers and administrators under error conditions. The cache provides the following access methods:

check-out—read cached data and apply write lock (no additional check-out is allowed and no writes are allowed until the record is checked-in);

read—read-only with no lock on data;

write—write non-transaction-related data into the cache (queued if a write-lock is in place);

check-in—write back into cache, removal of write lock, and processing of any queued writes; and update—write out cached data that has been changed to the database, and read in any new data provided by external sources (such as the Self-Administration Portal or the Administration Console).

Service Directory Retrieval Agent

As indicated above, the Service optionally includes a Directory Retrieval Agent (DRA) 570 for managing the subscriber population. It periodically accesses a network directory resource 575 (e.g. corporate directory server), optionally over an encrypted channel, to monitor membership in a named distribution list, then synchronizes the membership of that list to the subscribers held in the User Manager Agent (UMA) 250, including any changed information such as user name, mailbox name, and mailbox server.

To find the named distribution list, the DRA 570 accesses the directory server 575 (e.g. via the Lightweight Directory Access Protocol) and searches for the list of members. Once the list is found, it is traversed to discover all members, including those that are in nested distribution lists. A maximum nesting depth is used to prevent the possibility of one distribution list nesting a second distribution list that contains the first one. A further check is made to ensure there is no member duplication, and that all necessary attributes (user name, mailbox name, and mailbox server) are present.

Synchronization of the member list with the subscriber list is achieved by checking for the existence of each member in the User Database 80 (via the User Manager Agent 250). If the member is not subscribed, he/she is added to the User Database 80. If the member is already subscribed, the subscriber attributes are checked against the directory attributes, and updates are applied if necessary. If a subscriber is not in the member list, he/she is deemed to be unsubscribed, and the User Manager Agent 250 is asked to change the subscriber account status to unsubscribed.

Service User Status Agent

The User Status Agent (USA) 270 tracks subscriber account status, maintaining subscriber account status in the User Database 80 for administrative monitoring, and alerting subscribers of persistent problems experienced with their Service account. It is also responsible for extracting subscriber information from bounce/failure messages retrieved from the system error mailbox.

The USA receives events from all transaction processing agents in the application (Content Retrieval Agent 280, Content Personalization Agent 295, and Content Delivery Agent 290) for indication of subscriber transaction status updates. Specific responsibilities are:

- updates subscriber status after content has been retrieved, after content has been delivered, and whenever transactions are lost;
- decides when particular subscribers are in an error state based on Service Level Agreement parameters and status events;
- removes subscribers from error state once Service Level Agreement conditions are satisfied;
- informs subscribers by sending notifications (email messages) of problems encountered while processing their email; and
- monitors subscriber account transactions and writes closed transactions to the database.

Service Content Retrieval Agents

The Content Retrieval Agent ("CRA") 280 is a pool-able object. When given a subscriber's content source description, it dispatches a pooled agent appropriate for the content media type. For example, a mailbox source is serviced by an e-mail retrieval pooled agent, whereas a web content feed might be serviced by an RSS retrieval pooled agent.

The pooled agent connects to that subscriber's content source and downloads any new content that it has not yet seen, which generally means content that has appeared since the last poll. The method for doing this is different between different content types and standard/proprietary access protocols, hence the need for media-specific pooled agents. After retrieval completes, the CRA 280 creates an array of content items and returns these to the Class of Service Agent 260 for further processing. For example, the CRA receives a subscriber's mailbox information from the Class of Service Agent 260. It uses this information to connect via an e-mail retrieval protocol (such as secured IMAP or POP3, or a proprietary method such as Microsoft's MAPI) to the remote mail server (e.g. the Internet Mail Stores 120 shown in FIG. 1), and then downloads e-mail that has arrived later than the time of the previous poll from the subscriber's inbox (or other folder). (Note: for POP3 retrieval the entire mail folder must be downloaded and filtered through to find the new messages.) All content is left untouched on the server.

The standard CRA responsibilities are therefore:

- to assign a pooled agent appropriate for the content type;
- to connect to subscriber content sources;
- to identify newly-arrived content by comparing to previous poll results;
- to capture the new status of the content source;
- to send the processing result back to the COSA; and
- to send a retrieval status message to the User Status Agent.

For subscribers selecting a forwarded e-mail content source (where they arrange to have e-mail forwarded to a named Service mailbox), the COSA's request to the CRA includes the account information of the shared mailbox (i.e. as a 'special' subscriber). The CRA e-mail pooled agent collects all of this mail, deletes it from the named Service mailbox, and returns it to the COSA for 'forwarded' processing. A similar approach is used for the 'error' mailbox, where the account information of the Service error mailbox (i.e. as another 'special' subscriber) are processed and returned to the COSA for 'error' processing.

So the CRA responsibilities in these situations are:

- to connect to the communal mailbox;
- to retrieve all of the forwarded or error messages and delete it from the server;
- to get original sender (or mobile device address) from message bodies; and
- to send the processing results back to the COSA.

It will be appreciated that as new content types, media types, and content sources become available, the Service may be dynamically updated simply by the specification and provision of new Content Retrieval Agents configured to process such new sources. Particularly, the agent framework is extensible for operating such new Content Retrieval Agents for retrieving content from the new sources. Consequently, the remainder of the system may remain ignorant of and indifferent to the means by which the network content is retrieved for processing and forwarding to the mobile devices; even when a new Content Retrieval Agent is introduced, the same Content Personalization Agents and Content Delivery Agents may be used.

Service Content Personalization Agents

The Content Personalization Agent (CPA) 295 is a pool-able object used to apply user-preferences to filtering and formatting source content. When given a subscriber's content from a specific source from the Content Retrieval Agent 280 via the Class of Service Agent 260, the CPA dispatches a pooled agent appropriate for the content media type. For example, a mailbox source is serviced by an e-mail-aware pooled agent, whereas a web content feed or service alert might be serviced by an HTML-aware pooled agent. The CPA processes the set of content and creates a new array of device-dependent content to be delivered to the subscriber's device. Once it has finished processing it replaces the set of retrieved content in the payload object with the array of content to be forwarded. The payload is then forwarded to the Content Delivery Agent 290.

The CPA performs two general functions: determining whether a specific content item is forwardable, and formatting the content for presentation on the device. Determining whether a message is forwardable is implemented in several stages. First, the originator address is matched (with wildcard support) against an 'address whitelist', where a match indicates the content should be forwarded. If the 'address whitelist' is empty, the match is taken to be true. If no match is found, the text of the content (e.g. subject, body text, attachment titles, and optionally attachment text and metadata) is matched with wildcards against a 'phrase whitelist'. If no match is found, the content is deemed non-forwardable. If a match was found, the originating address is then matched against an 'address blacklist' (again with wildcard support), and the text of the content is matched against a 'phrase blacklist'. If a match is made on either of the blacklists, the content is deemed non-forwardable. Otherwise it will be forwarded to the device. These filtering methods are extendible in several ways. For example, the whitelists and blacklists can be supplemented by Service-wide lists provided by a corporate compliance officer, or could be provided in the form of category matches where the CPA matches against word lists or Bayesian filters if the User Data specifies these, or even whitelists and blacklists provided on centralized Directory Servers (e.g. a subscriber's contact list in the corporate directory).

If the content is forwardable, the CPA then formats it for presentation on the device. The formatted result can consist variously, depending on the device capabilities, channel capabilities, and user preference, of any of the following limited set of examples:

- the entire content (including attachments);
- just the passive or active text extracted from the content;
- a summary of the text of the content;

translations of text from the content (or of summaries of the content);
a list of any attachment names;
URLs pointing to a server that provides mobile rendering of attachments;
summaries of textual attachments;
translations of attachments (or of summaries of attachments);
rendered lower definition versions of images in, e.g. attachments; and/or
extracted portions of the content or attachments (e.g. first N bytes/N seconds of a media stream).

In addition, the CPA can filter all or a part of the network content in accordance with the user preferences or otherwise.

After the set of content is processed, the CPA 295 forwards the collection along with the User Data to the Content Delivery Agent 290 for delivery if necessary.

It will be appreciated that, as new content and media types become available, as well as new methods for processing or personalization such content, the Service may be dynamically updated simply by the specification and provision of new Content Personalization Agents configured to carry out such processing or personalization. Particularly, the agent framework is extensible for operating such new Content Personalization Agents. Consequently, the remainder of the system may remain ignorant of and indifferent to the means by which the retrieved network content is processed for forwarding to the mobile devices; even when a new Content Personalization Agent is introduced, the same Content Retrieval Agents and Content Delivery Agents may be used.

Service Content Delivery Agents

The Content Delivery Agent (CDA) 290 is a pool-able agent. Its role is to forward processed content to the subscribers' devices. With the receipt of a payload of processed content from the Content Personalization Agent 295, the CDA 290 dispatches a pooled agent appropriate for the type of channel available to reach the device (e-mail, push e-mail, SMS, MMS, proprietary, etc.). The pooled agent then determines the device address (and other protocol parameters) from the User Data sent along with the content. It then sends off the processed content to the device. For example an e-mail-enabled device receives the content via an SMTP gateway (e.g. an SMTP MTA 140 as shown in FIG. 1), and an SMS-enabled device receives the content via an SMS gateway (e.g. a Service Provider SMS Gateway 150 also as shown in FIG. 1). The CDA 290 notes pertinent details such as the content originator's address and if applicable, the SMS ID for storing in the record of the transaction that is stored in the User Database 80. (This is used by the 'SMS/MMS reply' account mechanism.)

When processed content is sent to a subscriber's device, the 'from' and/or 'reply to' addresses are set to be those of the original sender where appropriate. For example, with e-mail forwarding this allows the subscriber to reply to the originator directly from his device. For the example where e-mail is forwarded via an SMS gateway, the reply-to address maps to one of a set of specific SMS addresses which forward the received reply along with the device SMS address to one of a set of special named mailboxes for replies. These mailboxes are serviced by special 'SMS/MMS reply' subscriber accounts on the Service, where the replies are retrieved and then matched to the subscriber and forwarded to the originator by the Class of Service Agent (COSA).

When personalized content is too large for an individual device message (e.g. for SMS one message is only approximately 150 characters, or approximately 15 words), the content may be sent in several messages, subject to user personalization in the device definition. Examples of personalization include maximum message size, maximum number of separate messages, and whether or not content should be truncated to fit.

Error responses from the device are handled in protocol-specific ways. Protocols such as SMS and e-mail may experience immediate or delayed errors. Immediate errors are handled either by attempting delivery to an alternate device if one is configured (which requires special error handling by the COSA if the alternate device has a different delivery channel), or by the immediate initiation of a 'lost transaction' message to the User Status Agent or by marking the transaction as failed back to the COSA. Delayed errors, e.g. those caused by an e-mail bounce or a device being unreachable for several hours, are handled by the 'error' subscriber account method.

Secure delivery of content to the mobile device is achieved in a protocol-specific manner. For e-mail-enabled devices, if the device supports encrypted e-mail the subscriber provides his public key to the Service upon identification of the mobile device, and at the same time receives the Service public key from the subscription process. (An unencrypted email containing the key is sent to the device.) When delivering the content, the CDA encrypts the mail. For SMS- or MMS-enabled devices, a similar mechanism is used, but a specific client plug-in is required on the device. This plug-in also enables the concatenation of multiple messages together to form a larger message than would otherwise be allowed given the small size of SMS messages. In this case the CDA encrypts the entire personalized content, sending it in parts to the device, where each part is sequentially tagged for parsing by the plug-in. After receiving all parts, the plug-in decrypts the message for display to the subscriber.

Such a device plug-in can be used to provide further functionality, such as recognizing 'active tags' that identify the telephone number or Instant Message chat handle of the message originator. Active tags can also be used to trigger a user action such as payment for a product or service. For devices enabled with such a plug-in, the CDA attaches the appropriate tag(s) for the originator if it matches one in a personal contact list included in the User Data provided by the COSA. When the plug-in detects the presence of one of these tags, it would enable the subscriber to initiate a voice call or IM chat at the push of a button while reading the forwarded content.

It will be appreciated that, as the capabilities of mobile devices evolve, and as the modes of communication change, the Service may be easily dynamically updated by the specification and provision of new Content Delivery Agents configured to carry out such delivery. Particularly, the agent framework is extensible for operating such new Content Delivery Agents. Consequently, the remainder of the system may remain ignorant of and indifferent to the means by which retrieved and processed network content is forwarded to mobile devices; even when a new Content Delivery Agent is introduced, the same Content Retrieval Agents and Content Personalization Agents may be used.

Information Flow

Figure 6:
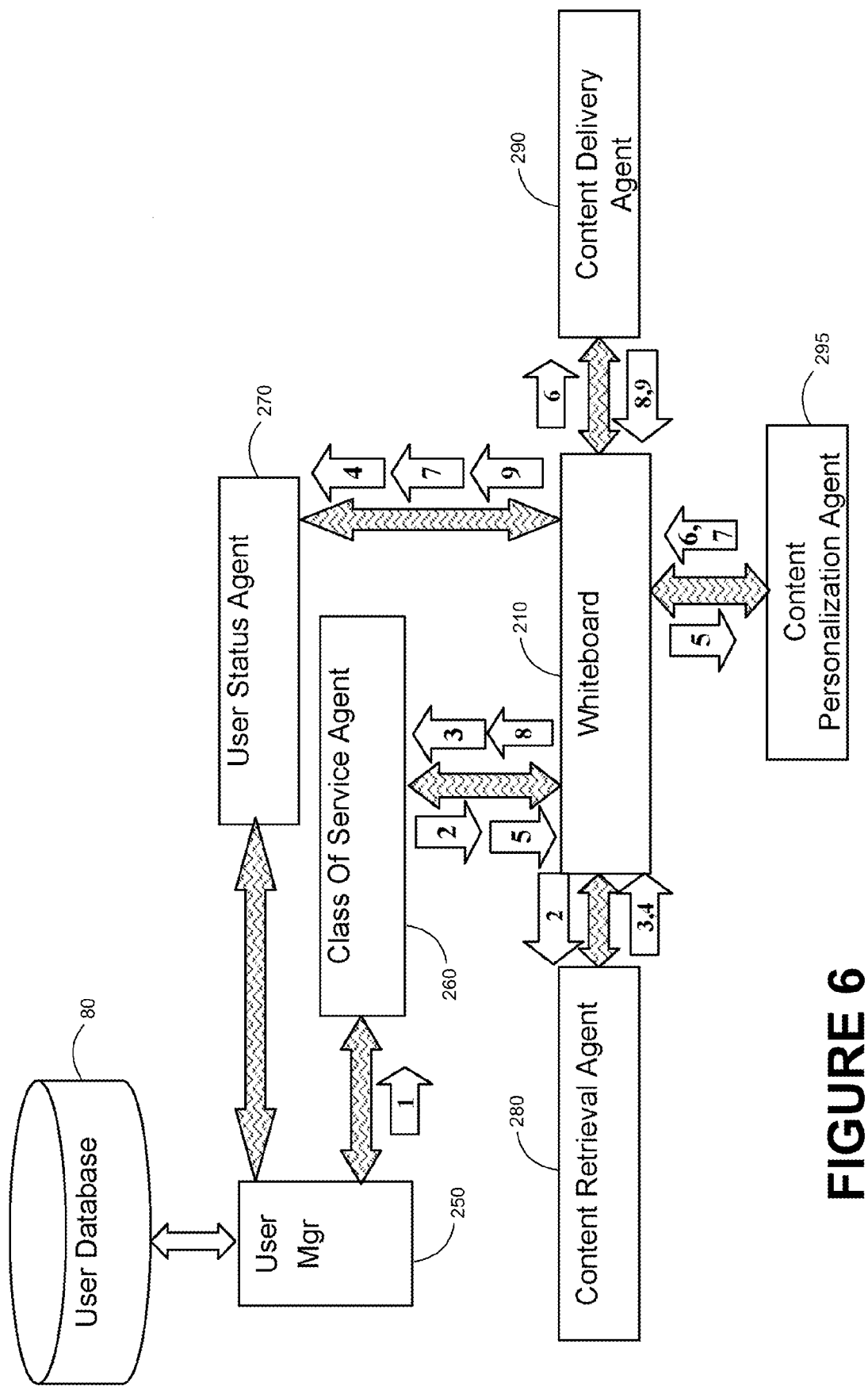
FIG. 6 shows a schematic diagram illustrating the flow of information through the system with respect to the Mobile Network Content Service illustrated in FIG. 5.

FIG. 6 shows a schematic diagram illustrating the flow of information through the system. Information flows in the Figure are shown as numbered open arrows and are referenced hereinafter by inclusion in brackets of the number identifying the flow. The shaded arrows in the Figure generally show information flow between the various components. In general, where a subscriber profile specifies external content to be accessed by the system, content arriving at such sources will not be retrieved by the system until the sources are polled by the system. As described above, the Class of Service Agent (COSA) 260 is configured to schedule the polling of user content sources in accordance with the Service Level Agreements (SLAs) and other parameters stored in the User Database 80. The COSA 260 therefore accesses the User Database 80 periodically via the User Manager 250 (flow [1]) in order to determine and update such scheduling.

When the polling of a subscriber's content sources is scheduled to occur, the COSA 260 notifies the Content Retrieval Agent (CRA) Pool Manager 280 (via the Whiteboard 210, as is all inter-agent communication) (flow [2]) to retrieve content from the configured sources. The message sent to the CRA Pool Manager 280 includes the subscriber User Data retrieved from the User Database 80. The CRA Pool Manager 280 then selects the next available pooled agent of the appropriate media type to perform the retrieval. The content retrieved is generally left untouched (i.e. a copy is retrieved by the CRA 280), but in appropriate cases (e.g. e-mail), if the subscriber preferences so direct the content may optionally be deleted from the source. Once the CRA pooled agent is finished its work, the CRA Pool Manager 280 then returns a collection of content to the COSA (flow [3]) (again, via the Whiteboard 210) and sends a status update to the User Status Agent (USA) 270 (flow [4]).

The COSA 260 in turn then forwards the retrieved content along with the User Data to the Content Personalization Agent (CPA) Pool Manager 295 (flow [5]) for processing. A media-appropriate CPA pooled agent is selected, which analyzes the individual content for relevance to the subscriber (per the preferences specified in the User Data), and then, when relevant, summarizes or otherwise formats the content as a separate message for the subscriber's device. The CPA 295 then forwards the collection of messages along with the User Data to the Content Delivery Agent (CDA) Pool Manager 290 (flow [6]) and sends a status update to the USA (flow [7]).

The CDA Pool Manager 290 then selects a channel-appropriate pooled agent to deliver any forwardable content to the subscriber's device. The pooled agent formats the channel 'envelope' (e.g. SMTP protocol sender and reply-to header, SMS header originator header, etc.) to indicate an appropriate return address, allowing the subscriber to respond to the message if appropriate. Upon completion of transmission, the CDA 290 sends notification to both COSA 260 (flow [8]) and the User Status Agent 270 (flow [9]) (for monitoring of subscriber account status).

When the COSA 260 receives notification of completion of that request, the account is checked back into the database.

Timer expirations at any stage of transaction processing will lead to a transaction being flagged as having been 'lost'. Depending upon the protocol scenario, the timeouts can require that a pooled agent be forcefully terminated (and then re-incarnated) by the Pool Manager (e.g. a timeout when retrieving e-mail from a POP3 mailbox). Smarter protocols provide their own timers, allowing the pooled agent to recover. In both cases, the 'transaction lost' message is sent to the USA, and the appropriate response message is sent to the COSA to indicate the transaction has completed (albeit unsuccessfully).

Many subscriber transactions can be in process in the Service simultaneously, bound by the high water marks of the numbers of content retrieval, processing, and delivery agents. Each transaction follows the information flow described above.

Although various exemplary embodiments of the invention have been disclosed, it should be apparent to those skilled in the art that various changes and modifications can be made which will achieve some of the advantages of the invention without departing from the true scope of the invention.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

It is to be appreciated that the section headings appearing hereinbefore do not limit the scope of the invention as described but are merely intended to organize the description for the sake of clarity.

With the foregoing exemplary embodiments having been disclosed, it will be apparent to those skilled in the art that various changes and modifications can be made to appropriately suit the needs and objectives of another application and still achieve the advantages of the invention; all such changes and modifications are intended to fall within the scope of the invention as defined by the claims that follow.

What is claimed is:

1. A computer-implemented system for retrieving network content from a plurality of network content sources and for delivering processed network content to a plurality of devices, each of a plurality of users of the computer-implemented system being associated with at least a corresponding one of the network content sources and at least a corresponding one of the plurality of devices, the computer-implemented system comprising:
   a database for storing a plurality of user profiles, each user profile being associated with a corresponding one of the plurality of users, the user profile associated with each user comprising:

for each of the plurality of network content sources associated with the user, a source specification identifying the network content source, wherein the computer-implemented system is for retrieving the network content from the network content source; and for each of the plurality of devices associated with the user, a device specification identifying the device, wherein the computer-implemented system is for processing and delivering to the device the network content retrieved from the network content sources associated with the user;

a first interface for communicating with the network content sources for retrieving the network content;

a second interface for communicating with the plurality of devices for delivering the processed network content to the plurality of devices; and an agent framework operatively connected to the database, the first interface, and the second interface, the agent framework operating a plurality of autonomous agents including:

a plurality of content retrieval agents for retrieving via the first interface the network content from the network content sources specified in the user profiles thereby producing retrieved network content, the content retrieval agents comprising, for each of a plurality of network content source types, at least one content retrieval agent for retrieving the network content from the network content sources corresponding to the network content source type;

a plurality of content personalization agents for processing the retrieved network content for display on the devices specified in the user profiles thereby producing the processed network content, the content personalization agents comprising, for each of a plurality of device types, at least one content personalization agent for processing the retrieved network content for display on the devices corresponding to the device type based on display capabilities of the device type; and a plurality of content delivery agents for delivering via the second interface the processed network content to the devices specified in the user profiles, the plurality of content delivery agents comprising, for each device type, at least one content delivery agent for delivering the processed network content to devices corresponding to the device type;

wherein each user is associated with a corresponding service level in a set of service levels, the set of service levels including at least a first service level and a second service level different from the first service level;

wherein each user profile further comprises a specification of the service level associated with the user associated with the user profile;

wherein the agent framework further operates a class of service agent for scheduling, based on the respective service levels associated with the users:
 the retrieval of the network content by the content retrieval agents;
 the processing of the retrieved network content by the content personalization agents; or
 the delivery of the processed network content by the content delivery agents;

wherein the network content of users associated with the first service level is retrieved, processed, or delivered in priority to the network content of users associated with the second service level; and wherein one of the plurality of network content sources is a message store associated with one of the plurality of users, wherein one of the content retrieval agents polls the message store at a polling frequency, and wherein the scheduling performed by the class of service agent includes determining the polling frequency based on the service level of the user associated with the message store.

2. The computer-implemented system according to claim 1, wherein the agent framework includes a whiteboard messaging service for providing messaging between the plurality of autonomous agents, wherein events generated by any one of the autonomous agents are received by the whiteboard, and wherein further the whiteboard forwards the generated events to a queue of any other one of the autonomous agents which had previously registered with the whiteboard to receive the generated events.

3. The computer-implemented system according to claim 1, wherein at least one of the content retrieval agents, the content personalization agents, or the content delivery agents respectively comprises: a pool manager, and a plurality of pooled agents, wherein the pooled agents collaboratively perform the retrieving, the processing, or the delivering.

4. The computer-implemented system according to claim 1, wherein processing the retrieved network content comprises performing a selected one of the following processing methods:
 extracting passive or active text from the network content;
 summarizing text in the network content;
 translating text in the network content;
 listing attachments in the network content;
 specifying a URL pointing to a server that provides rendering of attachments in the network content;
 rendering a lower definition version of an image in the network content;
 extracting a portion of the network content; and
 filtering all or a part of the network content,
 wherein, for each of the processing methods, the content personalization agents comprise at least one content personalization agent which performs the processing method.

5. The computer-implemented system according to claim 1, wherein the network content includes an electronic message, the processed network content includes Short Message Service or Multimedia Messaging Service (SMS/MMS) message corresponding to the electronic message, whereby the SMS or MMS message is forwarded to one of the devices by one of the content delivery agents, and wherein the class of service agent is further for accessing an SMS/MMS reply message store for receiving a reply from the device sent to the SMS/MMS reply message store, and further wherein the reply is relayed to the content delivery agent for delivery to a sender of the electronic message.

6. The computer-implemented system according to claim 1, wherein the class of service agent is further for accessing a remote control message store for receiving an electronic message from one of the devices sent to the remote control message store, the electronic message containing an identifier of the device and a command for causing the computer-implemented system:
 to delete from a user message store another electronic message corresponding to the processed network content delivered to the device;
 to deliver to the device a full version of the network content wherein the processed network content delivered to the device includes a summarized version of the network content;

to specify at least one other device for receiving the processed network content; or to turn a notification or alert on or off.

7. The computer-implemented system according to claim 1 further comprising a self-administration portal operatively connected to the user database for receiving from each user and storing in the database:

the source specification of each of the network content sources associated with the user;

a personalization option, wherein the network content processing performed by the content personalization agents on network content retrieved from the network content sources associated with the user is based on the personalization option; and the device specification of each device of the plurality of devices associated with the user.

8. A computer program product for enabling a computer to supply network content to a device, the computer program product comprising a computer-readable memory and software instructions stored in the computer-readable memory, the software instructions providing the computer-implemented system according to claim 1 when executed by a processor of the computer.

9. The computer-implemented system according to claim 1, wherein the autonomous agents further include a monitor agent for providing start-up, shutdown, and status monitoring for each of the autonomous agents.

10. The computer-implemented system according to claim 1, wherein the network content source types comprise Internet mail transfer agents, SMS gateways, Internet mail stores, corporate mail stores, RSS feeds, and web pages.

11. The computer-implemented system according to claim 1, wherein the device types comprise SMS/MMS devices and e-mail devices.

12. A computer-implemented system for retrieving network content from a plurality of network content sources and delivering processed network content to a plurality of devices, each of a plurality of users of the computer-implemented system being associated with at least a corresponding one of the network content sources and at least a corresponding one of the plurality of devices, each user being associated with a corresponding service level in a set of service levels including at least a first service level and a second service level different from the first service level, the computer-implemented system comprising:

a database for storing a plurality of user profiles, each user profile being associated with a corresponding one of the plurality of users, the user profile associated with each user comprising:

for each of the plurality of network content sources associated with the user, a source specification identifying the network content source, wherein the computer-implemented system is for retrieving the network content from the network content source;

for each of the plurality of devices associated with the user, a device specification identifying the device, wherein the computer-implemented system is for processing and delivering to the device the network content retrieved from the network content sources associated with the user; and the service level associated with the user;

a self-administration portal operatively connected to the database for receiving from each user the source specification of each of the plurality of network content sources associated with the user and the device specification of each of the plurality of devices associated with the user;

a first interface for communicating with the network content sources for retrieving the network content;

a second interface for communicating with the plurality of devices for delivering the processed network content to the plurality of devices; and an agent framework operatively connected to the database, the first interface and the second interface, the agent framework operating a whiteboard and a plurality of autonomous agents, the whiteboard providing messaging between the autonomous agents, wherein events generated by any one of the autonomous agents are received by the whiteboard, and wherein further the whiteboard forwards the generated events to a queue of any other one of the autonomous agents which had previously registered with the whiteboard to receive the generated events, the autonomous agents including:

a plurality of content retrieval agents for retrieving via the first interface the network content from the network content sources specified in the user profiles thereby producing retrieved network content, the content retrieval agents comprising, for each of a plurality of network content source types, at least one content retrieval agent for retrieving the network content from the network content sources corresponding to the network content source type;

a plurality of content personalization agents for processing the retrieved network content for display on the devices specified in the user profiles thereby producing the processed network content, the content personalization agents comprising, for each of a plurality of device types, at least one content personalization agent for processing the retrieved network content for display on the devices corresponding to the device type based on display capabilities of the device type; and a plurality of content delivery agents for delivering via the second interface the processed network content to the devices specified in the user profiles, the plurality of content delivery agents comprising, for each device type, at least one content delivery agent for delivering the processed network content to devices corresponding to the device type;

a scheduling agent for scheduling the retrieving by the content retrieval agents, the network content processing by the content personalization agents, and the delivering by the content delivery agents based on the respective service levels associated with the plurality of users specified in the database, wherein the network content of users associated with the first service level is retrieved, processed, or delivered in priority to the network content of users associated with the second service level; and a monitor agent for providing start-up, shutdown, and status monitoring for each of the plurality of autonomous agents, wherein the network content source types comprise Internet mail transfer agents, Short Message Service (SMS) gateways, Internet mail stores, corporate mail stores, Really Simple Syndication (RSS) feeds, and web pages; and wherein the device types comprise Short Message Service or Multimedia Messaging Service (SMS/MMS) devices and e-mail devices; and wherein processing the retrieved network content comprises performing a selected one of the following processing methods:

extracting active or passive text from the message;

preparing a summary of the text of the message;
preparing a translation of text from the message or of a summary of the text of the message;
preparing a translation of a summary of the message;
preparing a list of names of any attachments to the message;
preparing a list of URLs pointing to a server that provides mobile rendering of an attachment to the message;
preparing a summary of a textual attachment to the message;
preparing a translation of a textual attachment to a message or of a summary of the textual attachment to the message;
rendering a lower definition version of images in or attached to the message; and
extracting portions of the content of or attachments to the message,
wherein, for each of the processing methods, the content personalization agents comprise at least one content personalization agent which performs the processing method.

13. A computer-implemented method for retrieving network content from a plurality of network content sources and for delivering processed network content to a plurality of devices, each of a plurality of users being associated with at least a corresponding one of the network content sources and at least a corresponding one of the devices, the computer-implemented method comprising:
storing in a database a plurality of user profiles, each user profile being associated with a corresponding one of the plurality of users, the user profile associated with each user comprising:
for each of the plurality of network content sources associated with the user, a source specification identifying the network content source; and
for each of the plurality of devices associated with the user, a device specification identifying the device;
accessing a first interface for communicating with the network content sources for retrieving the network content;
accessing a second interface for communicating with the plurality of devices for delivering the processed network content to the plurality of devices;
providing an agent framework operatively connected to the database, the first interface and the second interface, the agent framework operating a plurality of autonomous agents including:
a plurality of content retrieval agents for retrieving via the first interface the network content from the network content sources specified in the user profiles thereby producing retrieved network content, the content retrieval agents comprising, for each of a plurality of network content source types, at least one content retrieval agent for retrieving the network content from the network content sources corresponding to the network content source type;
a plurality of content personalization agents for processing the retrieved network content for display on the devices specified in the user profiles thereby producing the processed network content, the content personalization agents comprising, for each of a plurality of device types, at least one content personalization agent for processing the retrieved network content for display on the devices corresponding to the device type based on display capabilities of the device type; and
a plurality of content delivery agents for delivering via the second interface the processed network content to the devices specified in the user profiles, the plurality of content delivery agents comprising, for each device type, at least one content delivery agent for delivering the processed network content to devices corresponding to the device type; and
for each user profile:
for each network content source specified in the user profile:
determining the network content source type of the network content source;
selecting one of the content retrieval agents configured for retrieving the network content from the network content sources of the network content source type; and
operating the content retrieval agent to retrieve the network content from the network content source; and
for each device specified in the user profile:
determining the device type of that device;
selecting one of the content personalization agents configured for processing the retrieved network content for display on devices corresponding to the device type;
operating the content personalization agent to process the retrieved network content for display on the device based on the display capabilities of the device type, thereby producing the processed network content;
selecting one of the content delivery agents configured for delivering the processed network content to devices corresponding to the device type; and
operating the content delivery agent to deliver the processed network content to the device.

14. The computer-implemented method according to claim 13, wherein processing the retrieved network content comprises performing a selected one of the following processing methods:
extracting passive or active text from the network content;
summarizing text in the network content;
translating text in the network content;
listing attachments in the network content;
specifying a URL pointing to a server that provides rendering of attachments in the network content;
rendering a lower definition version of an image in the network content;
extracting a portion of the network content; and
filtering all or a part of the network content,
wherein, for each of the processing methods, the content personalization agents comprise at least one content personalization agent which performs the processing method.

* * * * *